United States Patent [19]

Armbruster et al.

[11] Patent Number: 4,677,187

[45] Date of Patent: Jun. 30, 1987

[54] FURFURYL ALCOHOL-ALDEHYDE RESINS

[75] Inventors: David R. Armbruster, Forest Park; Merlyn Pasion, Chicago, both of Ill.

[73] Assignee: Acme Resin Corporation, Westchester, Ill.

[21] Appl. No.: 866,417

[22] Filed: May 23, 1986

[51] Int. Cl.[4] .............................................. C08G 4/00
[52] U.S. Cl. .................................. 528/232; 524/593; 524/598; 528/233; 528/235; 528/237
[58] Field of Search ............... 524/593, 598; 528/232, 528/233, 235, 237

[56] References Cited

U.S. PATENT DOCUMENTS 3,414,544  12/1968  Meiller .......................... 528/236 X
4,108,826   8/1978  Anderson et al. .............. 528/232 X Primary Examiner—Lucille M. Phynes

[57] ABSTRACT

Furfuryl alcohol-formaldehyde resins which can be prepared by using a water soluble multivalent metal salt as the catalyst, thereby eliminating the use of an acid catalyst and the necessary attention it requires.

10 Claims, No Drawings

FURFURYL ALCOHOL-ALDEHYDE RESINS

BACKGROUND OF THE INVENTION

1. Field of the Invention

The present invention relates to furfuryl alcohol-formaldehyde resins which are useful as foundry binder compositions, and as laminating, coating and bonding resins.

2. Description of the Prior Art

Furfuryl alcohol-formaldehyde resins are well known in the art and have been of commercial importance for many years. These resins are generally made by using an acid catalyst to catalyze the reaction of formaldehyde with furfuryl alcohol, or by reacting furfuryl alcohol with itself or a combination of these two reactions.

The use of an acid catalyst in forming furfuryl alcohol-formaldehyde resins requires a substantial amount of attention to control the acid pH of this reaction. If the pH becomes too low, the furfuryl alcohol may self-polymerize at a rate that could lead to a runaway reaction.

SUMMARY OF THE INVENTION

The present invention relates to furfuryl alcohol-formaldehyde resins which can be prepared by using a water soluble multivalent metal salt as the catalyst, thereby eliminating the use of an acid catalyst and the necessary attention it requires.

DESCRIPTION OF THE PREFERRD EMBODIMENTS

In accordance with the present invention, furfuryl alcohol-formaldehyde resins are produced in a process which incorporates a water soluble multivalent metal salt as the catalyst. The use of a water soluble multivalent metal salt eliminates the necessity of using a protonic acid catalyst and the reaction is carried out under essentially hydrous conditions.

The preferred source of formaldehyde is 50% formalin. However, other grades can be used. Paraformaldehyde can also be used if sufficient water is added to the reaction to maintain all or a substantial portion of the catalys in solution.

Furfuryl alcohol, formaldehyde and the multivalent metal salt catalyst are simply added to a reaction vessel and heated to reaction temperature.

The water soluble multivalent metal salt catalysts which can be used in this reaction include the multivalent ions of manganese, zinc, cadmium, magnesium, cobalt, nickel, copper, tin, iron, lead and calcium. Preferred catalysts are zinc acetate, lead acetate or mixtures thereof.

In the reaction of furfuryl alcohol, formalin and the multivalent metal salt catalyst, it is desirable to remove excess water from the condensation reaction and water present in formalin in excess of the amount necessary to solubilize the catalyst. The water removal can be accomplished by distillation during the reaction and increases the rate of reaction as well as reduce the water content of the final product. Water removal can be accomplished conveniently during the reaction or at any point which facilitates processing of the product.

An important constraint on the amount of water removed during the reaction is that sufficient water be present to maintain enough multivalent metal salt in aqueous solution to catalyze the reaction between the furfuryl alcohol and formaldehyde. Undissolved catalyst is not useful to catalyze the reaction. Therefore, an adequate amount of catalyst should be present in aqueous solution to catalyze the reaction.

The mole ratio of furfuryl alcohol to formaldehyde can vary from about 3:1 to about 0.5:1, respectively, preferably about 2:1 to 1:1.

The amount of water soluble multivalent metal salt used as the catalyst can vary from about 0.2 to about 8% by weight of the furfuryl alcohol.

The inventive reaction can be carried out at temperatures of about 85 to 105° C. at atmospheric pressure or at elevated temperatures under pressure. One of the primary concern in carrying out the reaction at elevated temperatures and pressures is to prevent the reaction mixture from boiling. Thus, for example, if an operating temperature of 140° C. were desired, the pressure must be correspondingly elevated to prevent the reaction mixture from boiling.

The end point of the reaction can be controlled by reacting to a free formaldehyde level or to a viscosity specification. The final product can be used as is or diluted with a suitable solvent, including furfuryl alcohol or water.

Although the reaction has been described in terms of formaldehyde, other aldehydes of the general formula: R—CHO can also be used, wherein R is a hydrocarbon radical containing about 1–8 carbon atoms such as formaldehyde, acetaldehyde, propionaldehyde, furfuraldehyde, and the like. The preferred form of formaldehyde is in the hydrous state, such as formalin.

Furfuryl alcohol or substituted furfuryl alcohol compounds can be used with the formula:

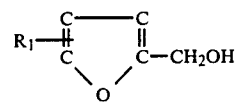

where $R_1$ can be an alkyl, aryl, alkenyl, alkylol, alkoxy, aryloxy, halogen or hydroxy radical. The preferred compound is furfuryl alcohol.

The examples which follow serve to illustrate the present invention, and all parts and percentages are by weight unless otherwise indicated.

EXAMPLE 1

Into a 5 liter 3 necked flask equipped with a stirrer, thermometer, and reflux condensor were charged 2000 grams of furfuryl alcohol, 1000 grams of 50% formalin and 80 grams of a 25% water solution of zinc acetate. Heat was applied to the flask and the contents reacted for 3 hours at a temperature of 95°–97° C. The reaction mixture was then cooled by dehydration and dehydrated at about 50° C. to remove 590 grams of distillate. The reaction was then continued for 20 hours and 55 minutes at 97°–98° C. with steam heat. At this time, the free formaldehyde level had dropped to 3.2% and the batch was cooled by applying cooling water to the flask. The product had viscosity of 1690 centipoise at 25° C. 50 grams of water were added to reduce the viscosity to 1115 centipoise. The final product had 15.5% unreacted furfuryl alcohol and 6.4% water.

EXAMPLE 2

Into a 5 liter 3 necked flask equipped with a stirrer, thermometer, and reflux condenser were charged 2000 grams of furfuryl alcohol, 700 grams of 50% formalin and 50 grams of a 25% water solution of zinc acetate. Heat was applied to the flask and the contents reacted for 1 hour and 20 minutes at 95° C. to 97° C. At this time an additional 600 grams of 50% formalin and 40 grams of 25% zinc acetate solution were added and the reaction continued for an additional 1 hour and 30 minutes at 95° C. to 97° C. The contents of the flask were then cooled to 70° C. and vacuum dehydrated at this temperature until the batch turned from clear to slightly hazy. The haziness indicated that a small portion of the catalyst had become insoluble at this temperature. 2596 grams of reaction product along with unreacted materials remained in the flask at this time. The batch was then heated to 95° C. to 97° C. and reacted for 16 hours and 45 minutes before cooling to give a final product with a viscosity of 1,490 cps at 25° C. containing 10.7% unreacted furfuryl alcohol and 5.2% unreacted formaldehyde.

What is claimed is:

1. A process for preparing furfuryl alcohol-aldehyde resins comprising:

reacting under hydrous conditions:

(a) an aldehyde of the formula R—CHO, wherein R is hydrogen or a hydrocarbon radical containing about one to eight carbon atoms; and (b) a furfuryl alcohol or a substituted furfuryl alcohol compound having the formula:

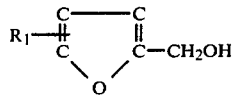

wherein $R_1$ can be an alkyl, aryl, alkenyl, alkylol, alkoxy, aryloxy, halogen or hydroxy radical, and mixtures thereof; said reaction being conducted in the presence of a catalytic amount of a water soluble multivalent metal salt wherein a sufficient amount of catalyst is present in aqueous solution to adequately catalyze said reaction.

2. The process of claim 1, wherein said catalyst is selected from the group consisting of zinc acetate, lead acetate, and mixtures thereof.

3. The process of claim 1, wherein the aldehyde is formaldehyde.

4. The process of claim 3, wherein the formaldehyde is formalin.

5. The process of claim 1, wherein the furfuryl derivative is furfuryl alcohol.

6. The process of claim 5, wherein the mole ratio of furfuryl alcohol to aldehyde can vary from about 3:1 to about 0.5:1, respectively.

7. The process of claim 6, wherein the amount of catalyst varies from about 0.2 to 8% by weight of furfuryl alcohol.

8. The process of claim 1, wherein the reaction temperature varies from about 85° to 105° C.

9. The process of claim 1, wherein the reaction is carried out at elevated pressure sufficient to prevent the reaction mixture from boiling and the temperature varies from about 105° C. to 140° C.

10. The process of claim 1, wherein the metal moiety of the water soluble multivalent metal salt is selected from the group consisting of Mn, Zn, Cd, Mg, Co, Ni, Fe, Pb, Ca, Cu, Sn, and mixtures thereof.

* * * * *